United States Patent
Luckjohn et al.

(10) Patent No.: US 11,780,523 B2
(45) Date of Patent: Oct. 10, 2023

(54) MULTI-MATERIAL SUPPORT PAD

(71) Applicant: Harley-Davidson Motor Company, Inc., Milwaukee, WI (US)

(72) Inventors: Kenneth G. Luckjohn, Sheboygan, WI (US); John Cullen, Mequon, WI (US); Rick Ziebell, Cerritos, CA (US)

(73) Assignee: Harley-Davidson Motor Company, Inc., Milwaukee, WI (US)

( * ) Notice: Subject to any disclaimer, the term of this patent is extended or adjusted under 35 U.S.C. 154(b) by 0 days.

(21) Appl. No.: 17/541,840

(22) Filed: Dec. 3, 2021

(65) Prior Publication Data

US 2023/0174182 A1   Jun. 8, 2023

(51) Int. Cl.
*B62J 1/26* (2006.01)
(52) U.S. Cl.
CPC ...................... *B62J 1/26* (2013.01)
(58) Field of Classification Search
CPC ...................... B62J 1/26; B62J 1/18
USPC ........................... 297/452.27, 214
See application file for complete search history.

(56) References Cited

U.S. PATENT DOCUMENTS

| | | | |
|---|---|---|---|
| 1,851,973 A * | 4/1932 | Brandt | B62J 1/26 248/598 |
| 5,016,941 A * | 5/1991 | Yokota | B60N 2/70 297/452.61 |
| 5,108,076 A * | 4/1992 | Chiarella | B62J 1/18 297/214 |
| 5,203,607 A | 4/1993 | Landi | |
| 6,625,830 B2 * | 9/2003 | Lampel | A61G 5/1045 5/655.5 |
| 7,032,967 B2 * | 4/2006 | Pyzik | B29D 99/0092 297/214 |
| 7,070,232 B2 | 7/2006 | Minegishi et al. | |
| 7,076,822 B2 | 7/2006 | Pearce | |
| 7,622,179 B2 | 11/2009 | Patel | |
| 7,625,629 B2 | 12/2009 | Takaoka | |
| 7,722,116 B2 | 5/2010 | Takada et al. | |
| 7,730,566 B2 | 6/2010 | Flick et al. | |
| 7,823,233 B2 | 11/2010 | Flick et al. | |
| 7,823,234 B2 | 11/2010 | Flick et al. | |
| 7,827,636 B2 | 11/2010 | Flick et al. | |
| 7,993,734 B2 | 8/2011 | Takaoka | |

(Continued)

FOREIGN PATENT DOCUMENTS

| | | |
|---|---|---|
| DE | 202018004424 U1 | 9/2019 |
| DE | 202019104930 U1 | 12/2019 |

(Continued)

OTHER PUBLICATIONS

European Patent Office Action for Application No. 22208301.6 dated May 8, 2023 (8 pages).

*Primary Examiner* — Milton Nelson, Jr.
(74) *Attorney, Agent, or Firm* — Michael Best & Friedrich LLP

(57) ABSTRACT

A vehicle seat includes a seat base, a seat foam supported by the seat base, and a support pad positioned between the seat base and at least a portion of the seat foam. The support pad being formed of a combination of a first material and a second material. A seat cover covering the support pad and the seat foam. The first material has a first recovery hysteresis and the second material has a second recovery hysteresis that is less than the first recovery hysteresis.

23 Claims, 7 Drawing Sheets

(56) References Cited

U.S. PATENT DOCUMENTS

| | | |
|---|---|---|
| 8,226,882 B2 | 7/2012 | Takaoka |
| 8,277,210 B2 | 10/2012 | Takaoka |
| 8,549,684 B2 | 10/2013 | Jusiak |
| 8,563,121 B2 | 10/2013 | Takaoka |
| 8,563,123 B2 | 10/2013 | Takaoka |
| 8,568,635 B2 | 10/2013 | Takaoka |
| 8,607,387 B2 | 12/2013 | Flick et al. |
| 8,628,067 B2 | 1/2014 | Pearce et al. |
| 8,757,996 B2 | 6/2014 | Takaoka |
| 8,828,293 B2 | 9/2014 | Takaoka |
| 8,919,750 B2 | 12/2014 | Pearce et al. |
| 8,932,692 B2 | 1/2015 | Pearce |
| 9,169,585 B2 | 10/2015 | Takaoka |
| 9,174,404 B2 | 11/2015 | Takaoka |
| 9,194,066 B2 | 11/2015 | Takaoka |
| 9,266,455 B2 | 2/2016 | Uramichi et al. |
| 9,487,116 B2 | 11/2016 | Bigolin |
| 9,561,612 B2 | 2/2017 | Takaoka |
| 9,603,461 B2 | 3/2017 | Pearce et al. |
| 9,918,559 B2 | 3/2018 | Osaki |
| 9,918,560 B2 | 3/2018 | Osaki |
| 9,938,649 B2 | 4/2018 | Taninaka et al. |
| 9,956,706 B2 | 5/2018 | Mogi et al. |
| 9,970,140 B2 | 5/2018 | Taninaka et al. |
| 9,981,412 B2 | 5/2018 | Mogi et al. |
| 9,981,613 B2 | 5/2018 | Ito et al. |
| 10,266,977 B2 | 4/2019 | Takaoka |
| 10,316,444 B2 | 6/2019 | Wakui et al. |
| 10,328,618 B2 | 6/2019 | Takaoka |
| 10,486,760 B1 | 11/2019 | Supowitz et al. |
| 10,632,881 B2 | 4/2020 | Kitamoto et al. |
| 10,632,885 B2 * | 4/2020 | Hojo ........................ B60N 2/58 |
| 10,772,445 B2 | 9/2020 | Pearce et al. |
| 2007/0246157 A1 * | 10/2007 | Mason .................. A47C 27/15 |
| | | 264/299 |
| 2007/0246975 A1 | 10/2007 | Bier et al. |
| 2016/0010250 A1 | 1/2016 | Taninaka et al. |
| 2016/0262561 A1 | 9/2016 | Pearce et al. |
| 2017/0043695 A1 | 2/2017 | Kitamoto et al. |
| 2017/0251379 A1 | 9/2017 | Whatcott |
| 2017/0251824 A1 | 9/2017 | Pearce |
| 2018/0305199 A1 | 10/2018 | Pearce et al. |
| 2018/0354395 A1 | 12/2018 | Arata et al. |
| 2019/0021514 A1 | 1/2019 | Hamilton et al. |
| 2019/0150629 A1 | 5/2019 | Pearce |
| 2019/0150631 A1 | 5/2019 | Pearce et al. |
| 2019/0291802 A1 | 9/2019 | Sung |
| 2019/0308683 A1 * | 10/2019 | Sung ........................ B62J 1/26 |
| 2020/0268162 A1 | 8/2020 | Pearce |

FOREIGN PATENT DOCUMENTS

| | | | |
|---|---|---|---|
| DE | 202020001983 U1 | 7/2020 | |
| EP | 1023861 A1 * | 8/2000 | ........... A47C 27/065 |
| EP | 1935388 B1 | 5/2013 | |
| EP | 2623081 B1 | 9/2015 | |
| EP | 2882638 B1 | 10/2016 | |
| EP | 2605688 B1 | 4/2019 | |
| EP | 2363319 B1 | 8/2019 | |
| EP | 3351462 B1 | 2/2020 | |
| EP | 3626592 A1 | 3/2020 | |
| EP | 3426096 B1 | 6/2020 | |
| JP | 5099325 B2 | 12/2012 | |
| JP | 5459436 B1 | 4/2014 | |
| JP | 5459438 B1 | 4/2014 | |
| JP | 5459439 B1 | 4/2014 | |
| JP | 6568881 B2 | 8/2019 | |
| JP | 6605780 B2 | 11/2019 | |
| JP | 6680813 B2 | 4/2020 | |
| JP | 6756845 B2 | 9/2020 | |
| WO | 2015129753 A1 | 9/2015 | |
| WO | WO2017155822 A1 | 9/2017 | |
| WO | WO2018057572 A1 | 3/2018 | |
| WO | WO2019018161 A1 | 1/2019 | |
| WO | WO2019099877 A1 | 5/2019 | |
| WO | WO2017155820 A1 | 9/2019 | |

* cited by examiner

MULTI-MATERIAL SUPPORT PAD

BACKGROUND

Portions of a vehicle such as seats, foot supports, grips, or the like may define a touch point for an operator of the vehicle (e.g., motorcycles, all-terrain vehicles, etc.). For seats, foam is typically used as the main component. During extended use or long trips, the seat foam may compress in response to the riding conditions and require a long time to return to its original form. When compressed, the material's shock absorption characteristics are compromised.

SUMMARY

In one aspect, the invention provides a vehicle seat including a seat base, a seat foam supported by the seat base, a support pad positioned between the seat base and at least a portion of the seat foam, the support pad being formed of a combination of a first material and a second material, and a seat cover covering the support pad and the seat foam. The first material has a first recovery hysteresis and the second material has a second recovery hysteresis that is less than the first recovery hysteresis.

In another aspect, the invention provides a vehicle seat including a seat base, a seat foam supported by the seat base, a support pad positioned between the seat base and at least a portion of the seat foam. The support pad including an elastomer skeleton, and a gel overmold section on the elastomer skeleton. A seat cover covering the support pad and the seat foam.

In another aspect, the invention provides a method of assembling a seat for a vehicle. The method including providing a seat base, providing a seat foam supported by the seat base, forming a support pad of an elastomer skeleton and a gel overmold section on the skeleton, positioning the support pad between the seat base and at least a portion of the seat foam, and covering the support pad and the seat foam to the seat base with a seat cover.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1:
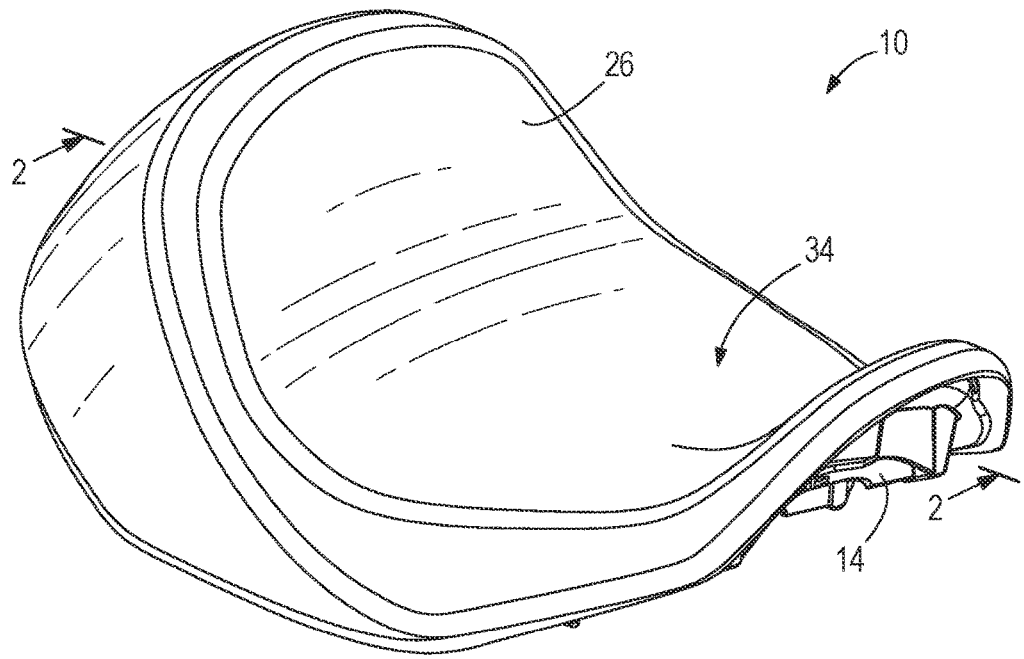
FIG. 1 is a perspective view of a seat for a vehicle according to an embodiment of the invention.
Figure 2:
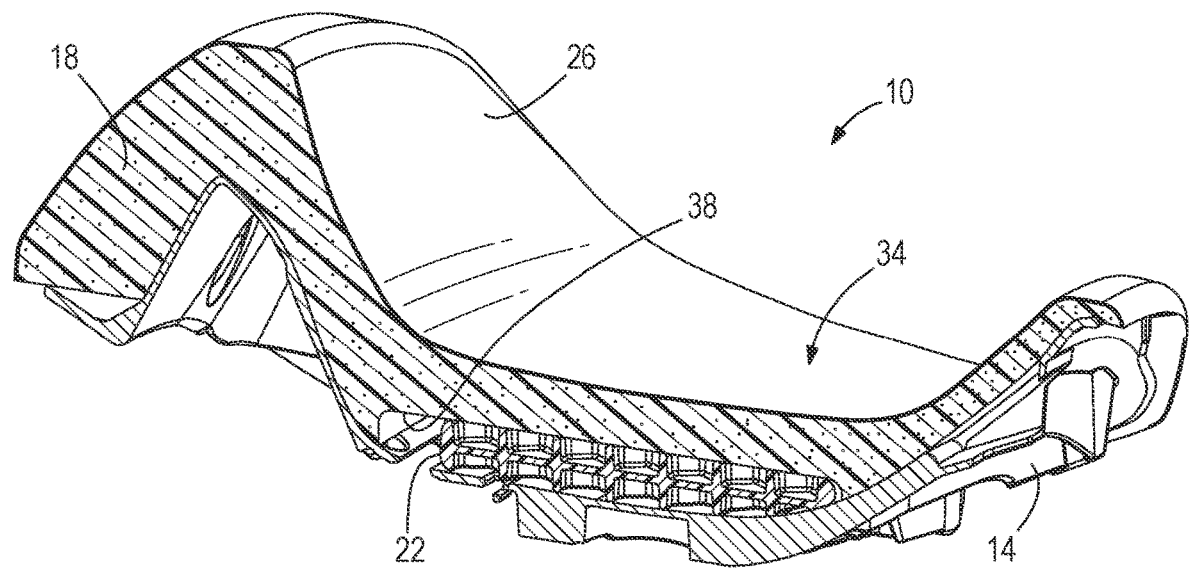
FIG. 2 is a cross-sectional view of the seat about a line 2-2 in FIG. 1.
Figure 3:
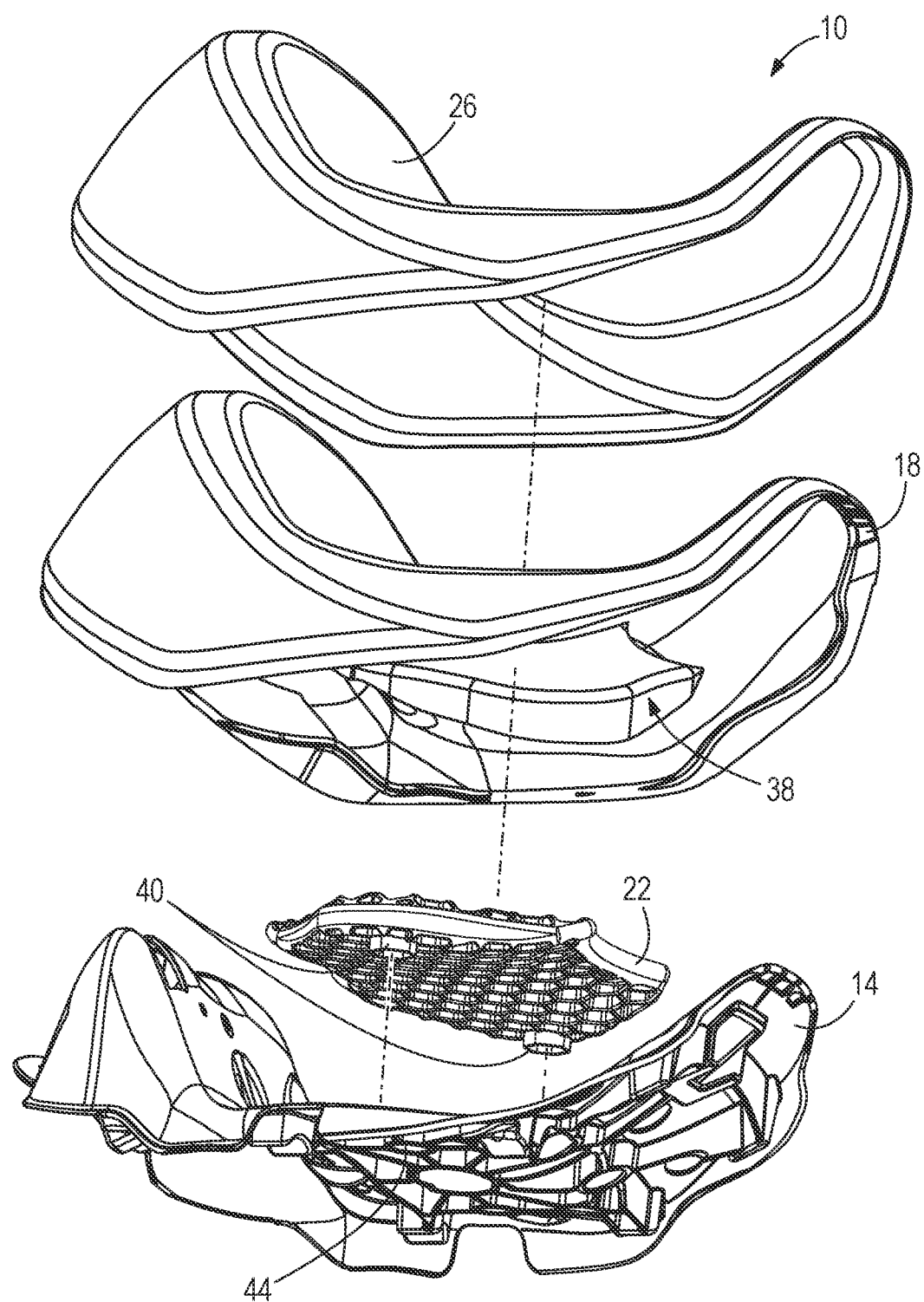
FIG. 3 is a perspective, exploded view of the seat of FIG. 1.

FIGS. 1-3 illustrate a seat 10 for a vehicle such as a motorcycle. In the illustrated embodiment, the seat 10 has a saddle-shaped geometry, which an operator straddles when operating the vehicle. As shown in FIGS. 2 and 3, the seat 10 includes a seat base 14, a seat foam 18 supported by the seat base 14, a support pad 22 positioned between the seat base 14 and at least a portion of the seat foam 18, and a seat cover 26 covering the support pad 22 and the seat foam 18 to secure the support pad 22 and the seat foam 18 to the seat base 14. The seat base 14 may be formed of a rigid material such as polypropylene plastic, or the like and may be secured to the vehicle (e.g., such as a motorcycle). The seat base 14 also includes one or more apertures (not shown) formed in the base 14 (e.g., as a cut-out, molded, or the like). The apertures may be in communication with a cooling device (e.g., a seat air conditioner) to provide climate control to the seat 10. It should be appreciated that the seat 10 described in detail herein may be used for other vehicles such as scooters, bicycles, all-terrain vehicles, or the like. Features may be adapted for automobiles, etc.

With continued reference to FIGS. 2 and 3, the seat foam 18 is shaped to be supported by the seat base 14 (e.g., has a corresponding saddle-shaped geometry). The seat foam 18 defines an operator support region 34 at a top side where an operator may be supported when seated on the vehicle (e.g., all or a majority of weight of the operator). The seat foam 18 also defines an internal cavity 38 (FIG. 3) that is sized to receive the support pad 22. In the illustrated embodiment, the internal cavity 38 is positioned at a bottom side opposite the operator support region 34. The seat foam 18 may be formed of open-cell polyurethane foam, closed-cell polyurethane foam, or the like.

The support pad 22 is positioned within the internal cavity 38 so the support pad 22 underlies all or a majority of the operator support region 34. In other embodiments, the support pad 22 may have a geometry that corresponds with and covers the entire seat base 14. The support pad 22 also includes securing protrusions 40 that selectively engage with recesses 44 formed in the seat base 14, which prevents movement of the support pad 22 relative to the seat base 14. In other embodiments, the seat base 14 may include protrusions that engage with recesses on the support pad 22. In other words, one of the seat base 14 or the support pad 22 includes a securing protrusion and the other of the seat base 14 or the support pad 22 includes a recess to receive the securing protrusion.

The seat cover 26 surrounds the top side of the seat foam 18 and is secured to the seat base 14 to secure the seat foam 18 and the support pad 22 to the seat base 14. The seat cover may be formed of vinyl, leather or the like. The seat cover 26 may be removably coupled to the seat base 14 such that the seat foam 18 and the support pad 22 can be removed from the seat base 14. In some embodiments, the seat foam 18 and the support pad 22 may be replaced with a replacement seat foam and/or a replacement support pad. In other embodiments, an alternative seat assembly may be retrofitted include the support pad 22. For example, the support pad 22 may positioned between a seat base and a seat foam of the alternative seat assembly.

As described in more detail below, the construction of the seat 10 improves the support provided to the operator during operation of the vehicle. During use, when a stress under a compressive load is imposed on the seat, the material does not immediately respond or return to its original shape. Upon removal of the compressive load, the materials of the seat usually recover to its original state, but slowly, and incompletely. The ratio of the final shape dimension over the initial shape dimension after the compressive load is removed with respect to time may be referred to herein as the compliance recovery, or creep recovery. It is preferable to use the reverse percentage term of these expressions herein defined as recovery hysteresis. Recovery hysteresis can be expressed as the ratio of the initial shape dimension minus the final shape dimension to the initial shape dimension after the load is removed with respect to time. For example, compliance recovery and creep recovery are related to recovery hysteresis by the reverse percentage (1−x), where x is the recovery hysteresis ratio.

Typically, the higher the recovery hysteresis, the more cushion or less rigid the seat is when the operator is seated. In the illustrated vehicle seat 10, the construction of the seat 10 creates a lower seat recovery hysteresis that does not sacrifice the desired seat cushion and is less rigid when the operator is seated compared to other vehicle seats. However, increasing the recovery hysteresis also increases the recovery time for the material to obtain its original shape. Further, the construction of the seat 10 has a fast seat recovery time with lower seat recovery hysteresis that better maintains the seat's designed shape compared to other vehicle seats. It is also important to consider the environmental conditions that a vehicle seat might be subjected to. In cold weather or hot, vehicle seats that are exposed to a variety of weather conditions must support the operator with comfort and low recovery hysteresis. In the illustrated vehicle seat 10, the materials of the support pad 22 have low glass transition temperatures (e.g., below that of the coldest weather conditions) to provide performance in cold weather. In addition, the materials of the support pad 22 also have high temperature materials that can resist softening in warm weather, which provides stability of performance. Together, the low and high service temperature ranges of the materials of the support pad 22 provides improved vehicle seat performance for the operator in all weather conditions compared to other vehicle seats. For example, the materials of the support pad 22 do not stiffen under extreme low temperatures (e.g., until the temperature reaches −72° F.) and do not soften as much with extreme heat (e.g., at temperatures over 100° F. or until the temperature reaches between 210° F. and 400° F.). As such, the performance of the vehicle seat 10 is more stable through a larger range of temperature than other vehicle seats.

Further, it should be appreciated that the recovery hysteresis and/or the recovery time may vary based on the temperature, amount of load applied to the material, frequencies of the load provided to the material and the like. To determine the recovery hysteresis, a creep recovery test may be conducted, which plots a function of strain or deformation of the material against time. During the creep recovery test, prescribed loading and unloading of the material is performed and the amount of deformation of the material remaining after unloading corresponds to the recovery hysteresis. Further, the load on the material is increased to determine the load required to create irrecoverable deformation of the material. The ratio of the initial shape dimension over the final shape dimension when the irrecoverable deformation begins corresponds to the modulus of elasticity limit. Therefore, it should be appreciated that the recovery hysteresis ranges provided herein are under a first set prescribed conditions (e.g., not overloaded, within a prescribed temperature range, etc.) and the modulus of elasticity limit are provided under a second set of prescribed conditions (e.g., overloaded, within a prescribed temperature range, etc.).

Other seats known in the art (e.g., formed of open-cell polyurethane foam, closed-cell polyurethane foam, or the like) typically have a high recovery hysteresis (e.g., between 10-30 percent) in order to allow the seat to compress during dynamic events. However, over extended use the seats tend to compress repeatedly without full recovery, which reduces cushioning or absorption for the operator. In addition, the standard seats tend to have slow recovery times (e.g., up to multiple hours) for the seat to obtain its original size due to the high recovery hysteresis. In the illustrated embodiment, the seat foam 18 has a recovery hysteresis of at least 10 percent.

In contrast to other seats known in the art, the combination of the seat foam 18 and the support pad 22 allows the seat 10 to be tuned to different required performance parameters (e.g., stiffness, dampening, or the like) during the manufacturing process of the seat 10. Further, the support pad 22 is formed as a combination of a first material and second material to further tune the performance of the seat 10 during the manufacturing process. For example, the size, the shape, and/or the amount of the first or second materials in the support pad 22 may be adjusted to tune the support pad 22 and the overall seat 10 to the desired performance parameters. As such, it should be appreciated that the support pad 22 illustrated in FIGS. 2-9 are exemplary embodiments of the of support pad 22 and that the shape, the size, and the amount of the first and second material may be adjusted to accommodate a desired application.

Figure 4:
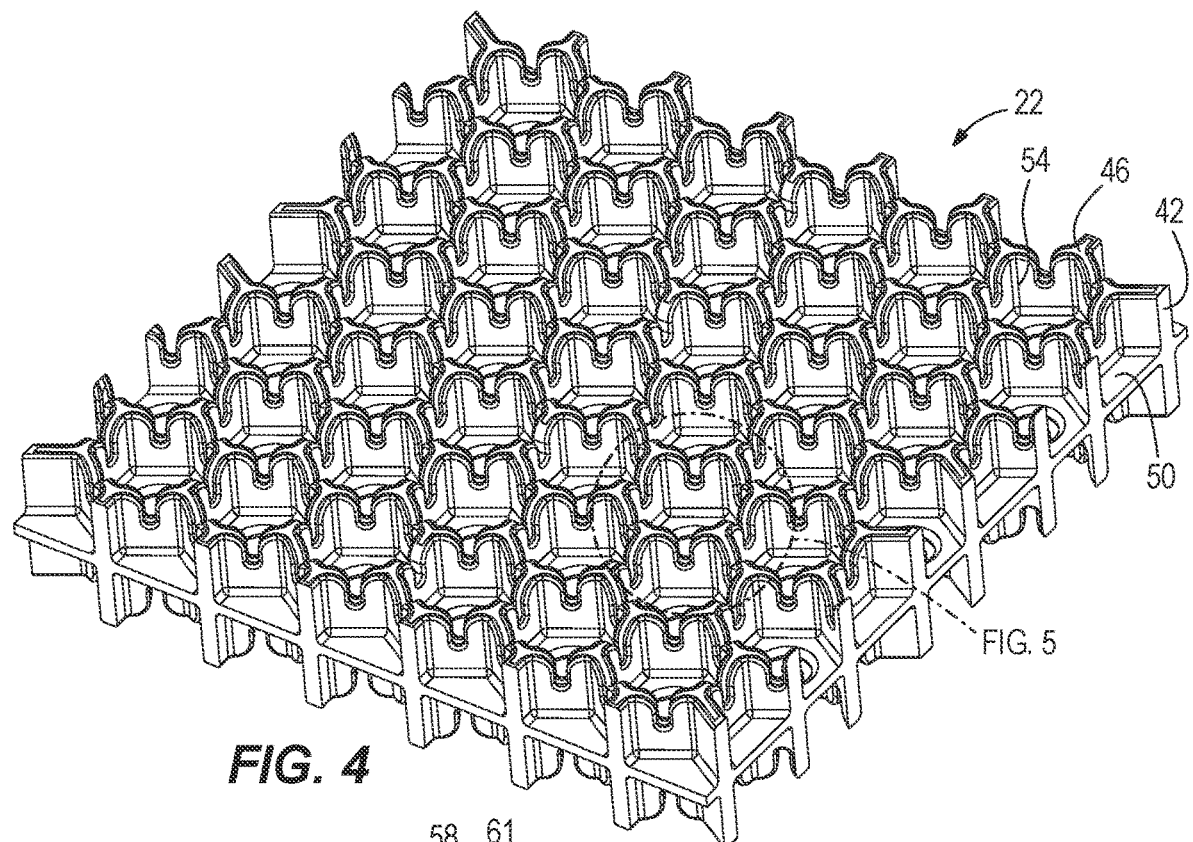
FIG. 4 is a perspective view of a support pad of the seat of FIG. 1
Figure 5:
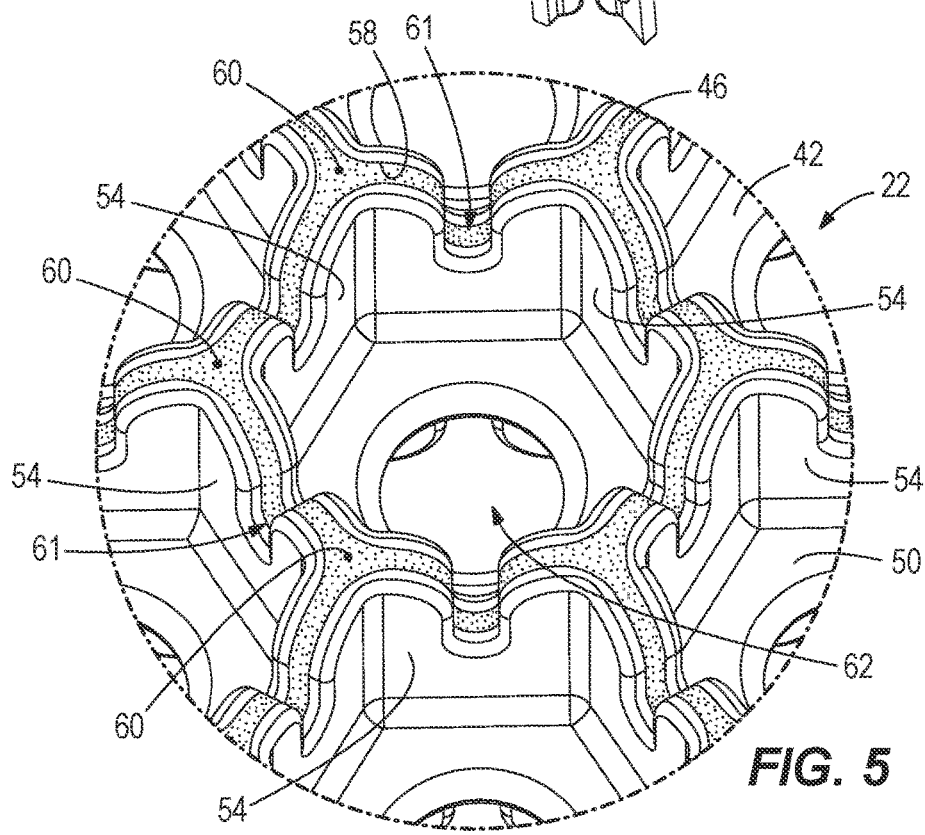
FIG. 5 is a perspective isolated view of a portion the support pad of FIG. 4.

Now with reference to FIGS. 4 and 5, the support pad 22 includes a skeleton 42 and an overmold section 46 on the skeleton 42. The skeleton 42 may be an elastomer skeleton formed of a first material such as one or more polymers comprise polysiloxane with substituents of methyl, trifluoropropyl, or phenyl, ethylene-propylene copolymer, ethylene-propylene-diene terpolymer or polymer, acrylonitrile-butadiene copolymer, styrene-butadiene copolymer, isoprene polymer, isobutylene-isoprene copolymer, chloroprene polymer, butadiene polymer, chlorinated polyethylene polymer, epichlorohydrin polymer, ethylene-acrylic copolymer, polyacrylate copolymers, ethylene-vinyl acetate copolymer, polypropylene oxide copolymer, polyether-urethane polymer, polyester-urethane polymer, or a combination thereof. The skeleton 42 provides improved vibration dampening, a higher recovery speed, a lower recovery hysteresis, a lower heat retention, and an improved durability within the operator support region 34 relative to seat foam 18. Specifically, the skeleton 42 has a first recovery hysteresis in a range from 3 to 10 percent and a first modulus of elasticity limit of not greater than 25 percent in compression.

The skeleton 42 includes a body portion 50 defining a planar surface and a plurality of wall portions 54 extending from the body portion 50. The plurality of wall portions 54 define a repeated pattern having a network of channels 58 defined therebetween. In the illustrated embodiment, the wall portions 54 extend from each side of the body portion 50. In other embodiments, the wall portions 54 may extend from a single side of the body portion 50. In addition, the predetermined pattern is a series of polygonal (e.g., hexagonal) wall portions 54. The wall portions 50 further define vertices 60 of the polygon and valleys 61 between the vertices 60. The network of channels 58 (e.g., pockets, recesses, or the like) are formed between adjacent wall portions 54 and extend continuously between the vertices (e.g., through the valleys 61). Therefore, the network of channels 58 are in continuous communication so the overmold section 46 can be formed continuously throughout or encapsulated within the network of channels 58. In other embodiments, the predetermined pattern may be a series of triangles, squares, circles, or the like. The skeleton 42 can also include an aperture 62 formed in the body portion 50 within (e.g., in between) the predetermined pattern defined by the wall portions 54. The aperture 62 allows airflow through the support pad 22. In other embodiments, the skeleton 42 may have an alternative geometry.

The overmold section 46 may be formed of a thixotropic material such as a polymeric gel that is typically based on liquid polymers in combination with an inorganic filler. The polymers can be polysiloxane, polybutadiene, or any type synthetic or natural liquid polymer. Since the overmold section 46 is thixotropic, the material may liquefy (e.g., when shaken stirred, or otherwise disturbed), which allows the material to be inserted within the network of channels 58. In some embodiments, the overmold 46 may be a gel overmold section 46. The overmold section 46 provides improved vibration dampening, a very low recovery hysteresis, and low stiffness relative to the seat foam 18. In some embodiments, the overmold section 46 has a second recovery hysteresis in a range from 1 to 5 percent and a first modulus of elasticity range limit of not greater than 50 percent in compression. Therefore, combining the two materials within the single support pad 22, allows for the performance parameters of the support pad 22 to be tuned to a desired stiffness, and recovery hysteresis.

The combination of the seat foam 18 and the support pad 22 in seat 10 allows the seat 10 to have low hysteresis loss during dynamic riding events, which increases a recovery speed of the seat 10, improves the vibration dampening of the seat 10, and reduces heat retention of the seat 10. In the illustrated embodiment, the seat 10 has a spring rate in a range of 1.0 lbf/in/in$^2$ to 8.0 lbf/in/in$^2$. Adjusting the size, shape, and construction of the support pad 22 within the seat 10 may adjust the spring rate of the seat 10.

Figure 6:
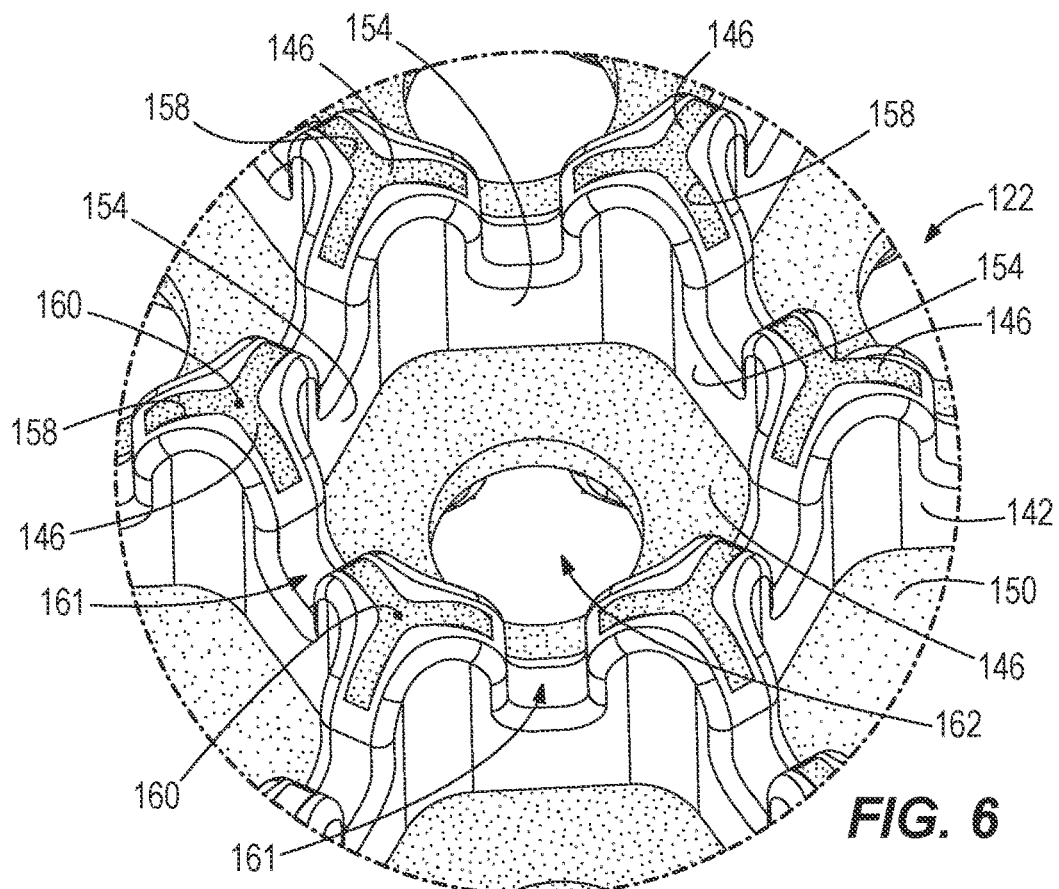
FIG. 6 is a perspective isolated view of a portion of a support pad according to another embodiment of the invention.

FIG. 6 illustrates a portion of a support pad 122 according to another embodiment of the invention. The support pad 122 is similar to the support pad 22 shown in FIG. 1-5 and described above. Therefore, like features are identified with like reference numerals plus "100", and only the differences between the two will be discussed.

The support pad 122 includes a skeleton 142 and an overmold section 146 on the skeleton 142. The skeleton 142 includes a body portion 150 defining a planar surface and a plurality of wall portions 154 extending from the body portion 150. The plurality of wall portions 154 define a repeated pattern having an array of channels 158 defined therein. In the illustrated embodiment, the predetermined pattern is a series of polygonal (e.g., hexagonal) wall portions 154. The wall portions 150 further define vertices 160 of the polygon and valleys 161 between the vertices 160. The array of channels 158 are formed at the vertices 160 of the polygonal. Further, the array of channel 158 are in discontinuous (e.g., do not extend through the valleys 161) and define three columns extending from the vertices 160. Therefore, the overmold section 146 is separately formed or encapsulated within each of the array of channels 158. In addition, the overmold section 146 is also formed on portions of the body portion 150 of the skeleton 142. It should be appreciated that overmold section 146 may also be formed on the entire skeleton 142. The skeleton 142 also includes an aperture 162 formed in the body portion 150 within the predetermined pattern defined by the wall portions 154. The aperture 162 allows airflow through the support pad 122.

Figure 7:
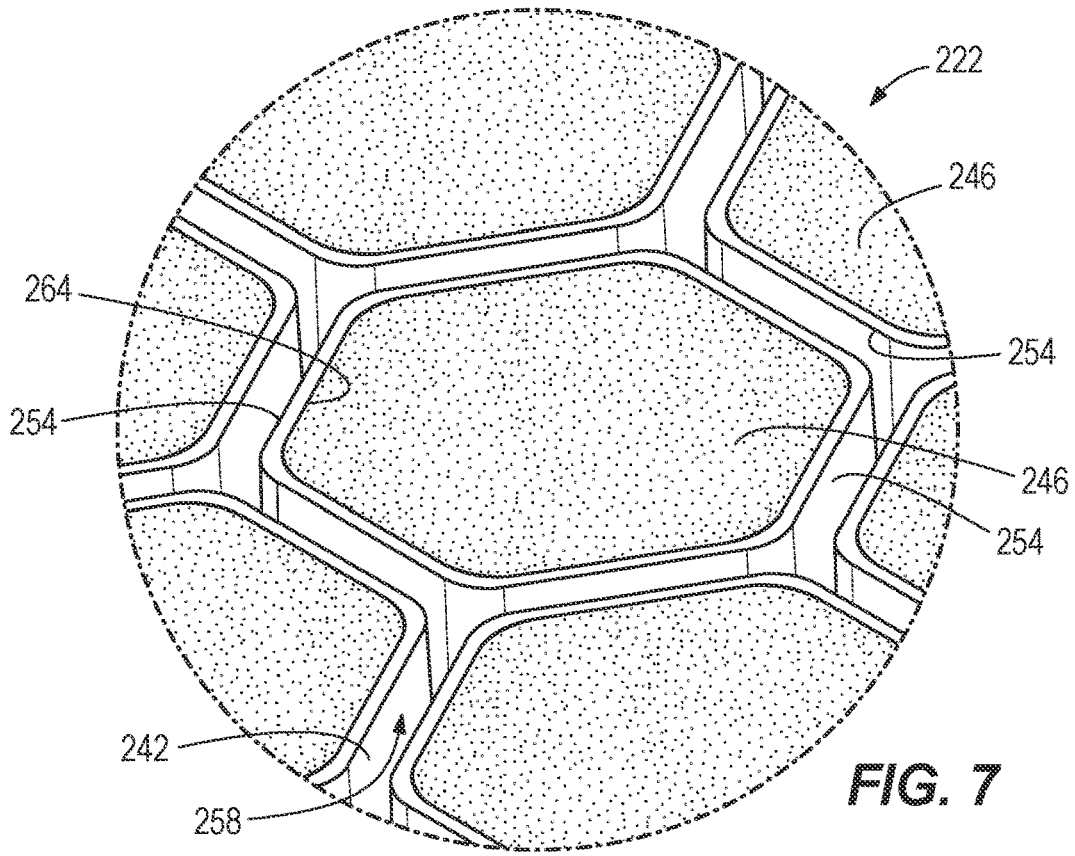
FIG. 7 is a perspective isolated view of a portion of a support pad according to another embodiment of the invention.

FIG. 7 illustrates a portion of a support pad 222 according to another embodiment of the invention. The support pad 222 is similar to the support pad 22 shown in FIG. 1-5 and described above. Therefore, like features are identified with like reference numerals plus "200", and only the differences between the two will be discussed.

The support pad 222 includes a skeleton 242 and an overmold section 246 on the skeleton 242. The skeleton 242 includes a plurality of wall portions 254 defining a repeated pattern that is separated by a network of channels 258 defined therebetween. In the illustrated embodiment, the predetermined pattern is a series of polygonal (e.g., hexagonal) wall portions 254 having an array of channels 264 defined within the repeated pattern. The overmold section 246 is formed or encapsulated within the array network of channels 264 defined within the repeated pattern, while the network of channels 258 is devoid of the overmold section 246.

Figure 8:
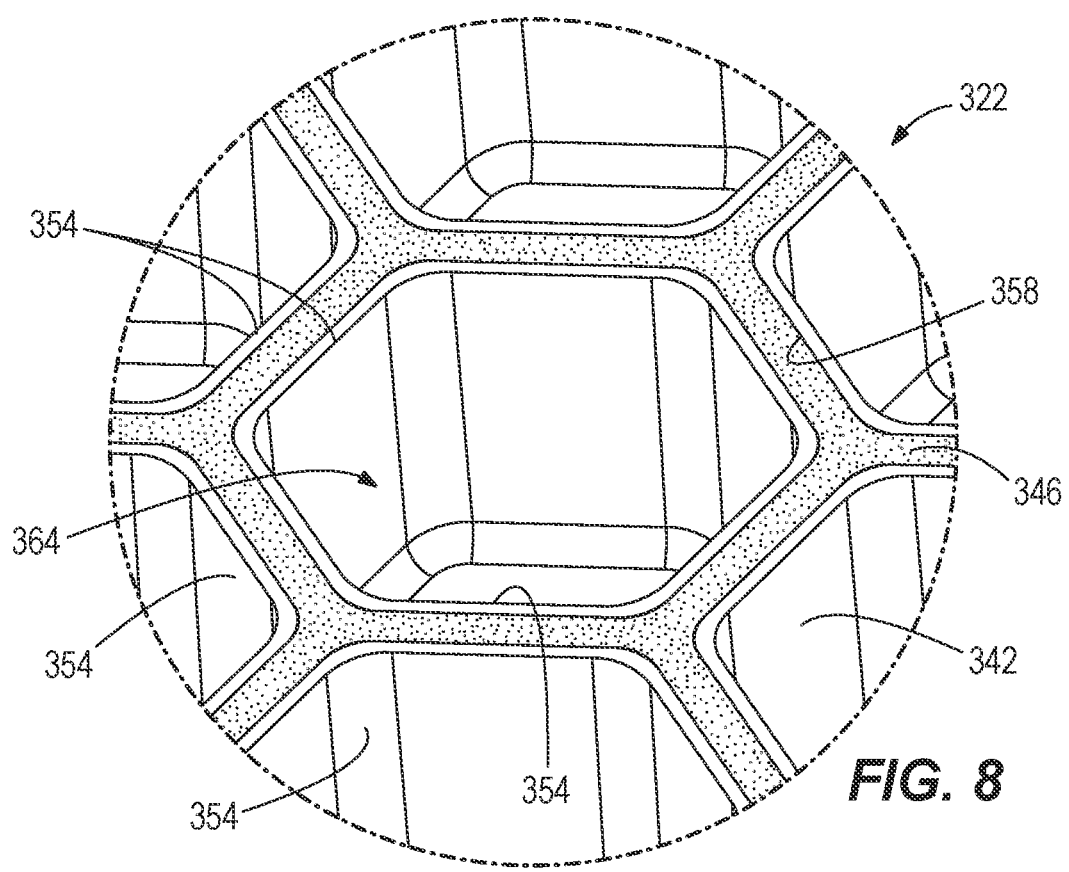
FIG. 8 is a perspective isolated view of a portion of a support pad according to another embodiment of the invention.

FIG. 8 illustrates a portion of a support pad 322 according to another embodiment of the invention. The support pad 322 is similar to the support pad 22 shown in FIG. 1-5 and described above. Therefore, like features are identified with like reference numerals plus "300", and only the differences between the two will be discussed.

The support pad 322 includes a skeleton 342 and an overmold section 346 on the skeleton 342. The elastomer skeleton 342 includes a plurality of wall portions 354 defining a repeated pattern that is separated by a network of channels 358 defined therebetween. In the illustrated embodiment, the predetermined pattern is a series of polygonal (e.g., hexagonal) wall portions 354 having an array of channels 364 defined within the repeated pattern. The overmold section 346 is formed or encapsulated within the first network of channels 358, while the array of channels 364 is devoid of the overmold section 346.

Figure 9:
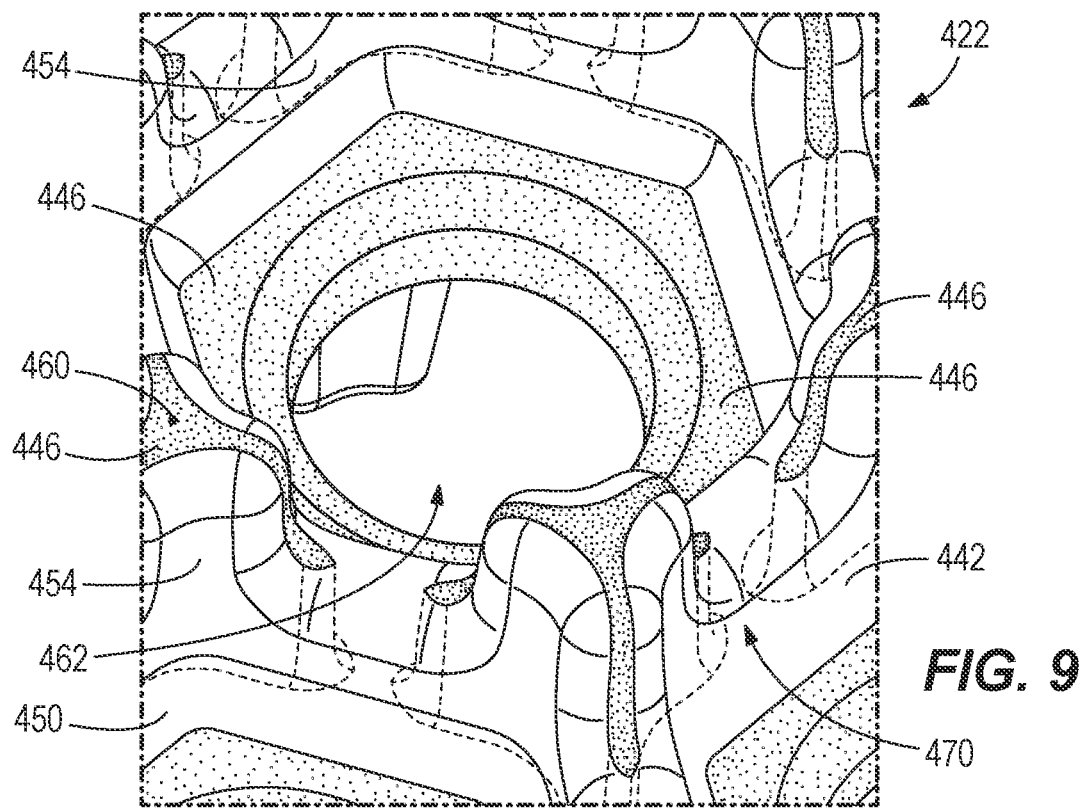
FIG. 9 is a perspective isolated view of a portion of a support pad according to another embodiment of the invention.

FIG. 9 illustrates a portion of a support pad 422 according to another embodiment of the invention. The support pad 422 is similar to the support pad 22 shown in FIG. 1-5 and described above. Therefore, like features are identified with like reference numerals plus "400", and only the differences between the two will be discussed.

The support pad 422 includes a skeleton 442 and an overmold section 446 on the skeleton 442. The skeleton 442 includes a body portion 450 and a plurality of wall portions 454 extending from the body portion 450. The plurality of wall portions 454 define a repeated pattern having an array of channels 458 defined therein. In the illustrated embodiment, the predetermined pattern is a series of discontinuous polygonal (e.g., hexagonal) wall portions 154. The wall portions 454 define the vertices 460 of the polygon and are separated by recesses 470. The overmold section 446 is formed or encapsulated within each of the array of channels 458. In addition, the overmold section 446 is also formed on at least a portion of the body portion 450 of the skeleton 442. The skeleton 442 also includes an aperture 462 formed in the body portion 450 within the predetermined pattern defined by the wall portions 454. The aperture 462 allows airflow through the support pad 422.

Figure 10:
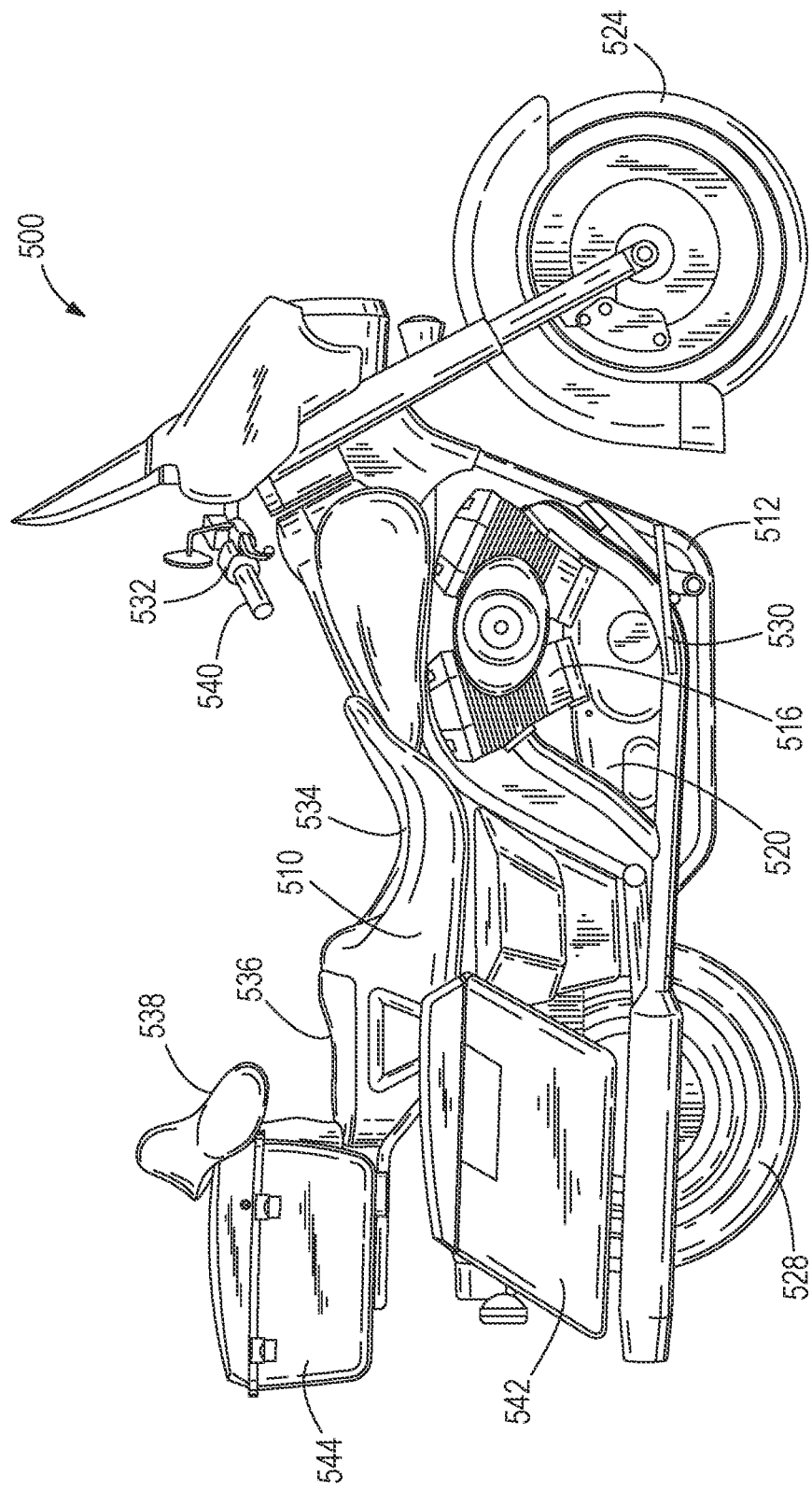
FIG. 10 is a perspective view of a motorcycle according to an embodiment of the invention.

FIG. 10 illustrates a motorcycle 500 according to an embodiment of the invention. The motorcycle 500 includes a frame 512 that supports an engine 516, a drivetrain 520, a front wheel 524, a rear wheel 528, a pair of footrests 530 (e.g., pegs, footboards), a handlebar assembly 532, and a seat 510. The engine 516 is mounted to the frame 512 and the drivetrain 520 connects the engine 516 to the rear wheel 528 such that the engine 516 powers the rotation of the rear wheel 528. The engine 516 can be an internal combustion engine having an inherent vibration characteristic. In other embodiments, the engine 516 may be replaced with an electric motor. In the illustrated embodiment, the seat 510 includes a first or operator support region 534, a second or passenger support region 536, and a back support 538. The handlebar assembly 532 includes a pair of handgrips 540. The motorcycle 500 also includes hard saddlebags 542 and a center-mounted luggage compartment in the form of a trunk 544 mounted to the frame 512. The footrest assembly 530, the first and second operator support regions 534, 536 of the seat 510, the back support 538, the handgrips 540, and the like each define a touch point for the operator of the motorcycle 500. Any of the support pads 22, 122, 222, 322, 422, described in detail above, may be incorporated in any of the touch points of the motorcycle to reduce vibration and improve comfort for the operator.

Figure 11:
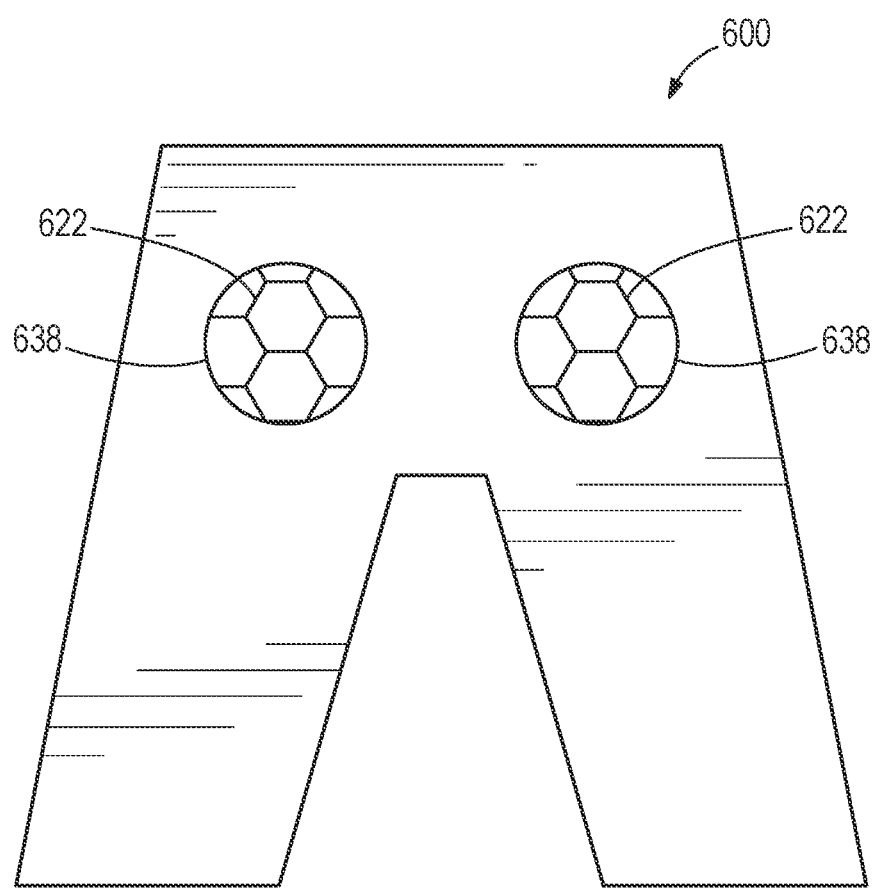
FIG. 11 is a schematic view of a rider wearable according to an embodiment of the invention.

FIG. 11 illustrates a rider wearable 600 such as pants. The rider wearable 600 may include one or more support cavities 638 that a support pad 622 may be received or incorporated within. It should be appreciated that the support pad 622 may be similar to any of the support pads 22, 122, 222, 322, 422 described in detail above. In other embodiments, the support pad 622 may be incorporated into types of rider wearables such as helmets, jackets, gloves, or the like.

Various aspects of the invention are set forth in the following claims.

What is claimed is:

1. A vehicle seat comprising:
   a seat base;
   a seat foam supported by the seat base;
   a support pad positioned between the seat base and at least a portion of the seat foam, the support pad being formed of a combination of a first material and a second material; and
   a seat cover covering the support pad and the seat foam,
   wherein the first material has a first recovery hysteresis and the second material has a second recovery hysteresis that is less than the first recovery hysteresis,
   wherein the first recovery hysteresis is in a range from 3 to 10 percent and the second recovery hysteresis is in a range from 1 to 5 percent.

2. The vehicle seat of claim 1, wherein the seat foam includes a cavity defined therein to receive the support pad.

3. The vehicle seat of claim 2, wherein the seat foam defines an operator support region at a top side, and wherein the cavity is positioned at a bottom side opposite the operator support region.

4. The vehicle seat of claim 1, wherein the seat has a saddle-shaped structure.

5. The vehicle seat of claim 1, wherein the first material has a first modulus of elasticity limit and the second material has a second modulus of elasticity limit, and wherein the first modulus of elasticity limit is less than the second modulus of elasticity limit.

6. The vehicle seat of claim 5, wherein the first modulus of elasticity limit is less than 25 percent and the second modulus of elasticity limit is less than 50 percent.

7. The vehicle seat of claim 1, wherein the first material is an elastomer providing a skeleton of the support pad and the second material of the support pad is a gel provided as an overmold section on the skeleton.

8. The vehicle seat of claim 7, wherein the gel is thixotropic and based on liquid polymers in combination with an inorganic filler.

9. The vehicle seat of claim 7, wherein the skeleton includes a body portion and a plurality of wall portions extending from the body portion, and wherein the plurality of wall portions define a repeated pattern having a network of channels.

10. The vehicle seat of claim 9, wherein the overmold section is encapsulated within the network of channels.

11. The vehicle seat of claim 9, wherein the overmold section is on at least a portion of the body portion of the skeleton.

12. A vehicle seat comprising:
    a seat base;
    a seat foam supported by the seat base;
    a support pad positioned between the seat base and at least a portion of the seat foam, the support pad being formed of a combination of a first material and a second material; and
    a seat cover covering the support pad and the seat foam,
    wherein the first material has a first recovery hysteresis and the second material has a second recovery hysteresis that is less than the first recovery hysteresis,
    wherein the first material has a first modulus of elasticity limit and the second material has a second modulus of elasticity limit, and wherein the first modulus of elasticity limit is less than the second modulus of elasticity limit,
    wherein the first modulus of elasticity limit is not greater than 25 percent and the second modulus of elasticity limit is less than 50 percent.

13. A vehicle seat comprising:
    a seat base;
    a seat foam supported by the seat base;
    a support pad positioned between the seat base and at least a portion of the seat foam, the support pad including:
      an elastomer skeleton; and
      a gel overmold section on the elastomer skeleton, wherein the elastomer skeleton has a first recovery hysteresis and the gel overmold section has a second recovery hysteresis that is less than the first recovery hysteresis; and
    a seat cover covering the support pad and the seat foam.

14. The vehicle seat of claim 13, wherein the seat foam includes a cavity defined therein to receive the support pad.

15. The vehicle seat of claim 14, wherein the seat foam defines an operator support region at a top side, and wherein the cavity is positioned at a bottom side opposite the operator support region.

16. The vehicle seat of claim 13, wherein the seat has a saddle-shaped structure.

17. The vehicle seat of claim 13, wherein the elastomer skeleton includes a body portion and a plurality of wall portions extending from the body portion, and wherein the plurality of wall portions define a repeated pattern having a network of channels.

18. The vehicle seat of claim 17, wherein the repeated pattern is a series of polygonal wall portions.

19. A method of assembling a seat for a vehicle, the method comprising:
- providing a seat base;
- providing a seat foam supported by the seat base;
- forming a support pad of an elastomer skeleton and a gel overmold section on the skeleton, wherein the elastomer skeleton has a first recovery hysteresis and the gel overmold section has a second recovery hysteresis that is less than the first recovery hysteresis;
- positioning the support pad between the seat base and at least a portion of the seat foam; and
- covering the support pad and the seat foam to the seat base with a seat cover.

20. The method of claim 19, further comprising positioning the support pad within a cavity formed in the seat foam.

21. A vehicle seat comprising:
- a seat base;
- a seat foam supported by the seat base;
- a support pad positioned between the seat base and at least a portion of the seat foam, the support pad being formed of a combination of a first material and a second material; and
- a seat cover covering the support pad and the seat foam,
- wherein the first material has a first recovery hysteresis and the second material has a second recovery hysteresis that is less than the first recovery hysteresis,
- wherein the first material is an elastomer providing a skeleton of the support pad and the second material of the support pad is a gel provided as an overmold section on the skeleton.

22. The vehicle seat of claim 21, wherein the second material is a polymeric gel based on liquid polymers, wherein the liquid polymers are selected from a group consisting of
- polysiloxane,
- polybutadiene, and
- synthetic or natural liquid polymers.

23. The vehicle seat of claim 21, wherein the first material is selected from a group consisting of
- one or more polymers with polysiloxane with substituents of methyl, trifluoropropyl, or phenyl,
- ethylene-propylene copolymer,
- ethylene-propylene-diene terpolymer or polymer,
- acrylonitrile-butadiene copolymer,
- styrene-butadiene copolymer,
- isoprene polymer,
- isobutylene-isoprene copolymer,
- chloroprene polymer,
- butadiene polymer,
- chlorinated polyethylene polymer,
- epichlorohydrin polymer,
- ethylene-acrylic copolymer,
- polyacrylate copolymers,
- ethylene-vinyl acetate copolymer,
- polypropylene oxide copolymer,
- polyether-urethane polymer, and
- polyester-urethane polymer.

\* \* \* \* \*